US008038053B2

(12) United States Patent
Kapsis

(10) Patent No.: US 8,038,053 B2

(45) Date of Patent: Oct. 18, 2011

(54) VOTING APPARATUS WITH SECURE BALLOT BOX ASSEMBLY

(75) Inventor: James L. Kapsis, Albertson, NY (US)

(73) Assignee: Precise Voting LLC, Mineola, NY (US)

( * ) Notice: Subject to any disclaimer, the term of this patent is extended or adjusted under 35 U.S.C. 154(b) by 663 days.

(21) Appl. No.: 12/043,590

(22) Filed: Mar. 6, 2008

(65) Prior Publication Data

US 2009/0224030 A1 Sep. 10, 2009

(51) Int. Cl.

*G07C 13/00* (2006.01)

*G06F 11/00* (2006.01)

(52) U.S. Cl. ................. 235/51; 235/52; 235/56; 705/12

(58) Field of Classification Search .................... 235/51, 235/50 B, 54 C, 54 E, 54 F, 55 E, 56, 385, 235/52; 434/306; 705/12

See application file for complete search history.

(56) References Cited

U.S. PATENT DOCUMENTS

| | | | | |
|---|---|---|---|---|
| 3,682,375 | A * | 8/1972 | Partovi-Najafabadi | 235/50 A |
| 4,641,241 | A * | 2/1987 | Boram | 705/12 |
| 4,774,665 | A * | 9/1988 | Webb | 705/12 |
| 4,877,235 | A * | 10/1989 | Robinson et al. | 271/279 |
| 4,981,259 | A * | 1/1991 | Ahmann | 232/2 |
| 4,998,998 | A * | 3/1991 | Shigetoshi et al. | 271/263 |
| 5,610,383 | A * | 3/1997 | Chumbley | 235/386 |
| 6,648,144 | B2 * | 11/2003 | Vogel | 209/554 |
| 6,824,043 | B2 * | 11/2004 | Navarro Jimenez | 232/2 |
| 6,892,944 | B2 * | 5/2005 | Chung et al. | 235/386 |
| 6,926,155 | B2 * | 8/2005 | Vogel | 209/554 |
| 7,077,314 | B2 * | 7/2006 | Johnson | 235/386 |
| 7,111,782 | B2 * | 9/2006 | Homewood et al. | 235/386 |
| RE40,449 | E * | 8/2008 | Provitola et al. | 235/386 |
| 7,654,457 | B2 * | 2/2010 | Wilson et al. | 235/386 |
| 2001/0050306 | A1 * | 12/2001 | Plumb | 232/2 |
| 2002/0092908 | A1 * | 7/2002 | Chumbley | 235/386 |
| 2002/0148889 | A1 * | 10/2002 | Vogel | 232/2 |
| 2005/0247783 | A1 * | 11/2005 | Poulos et al. | 235/386 |
| 2006/0226221 | A1 * | 10/2006 | Langberg | 235/386 |
| 2009/0173778 | A1 * | 7/2009 | Cummings et al. | 235/51 |
| 2009/0256703 | A1 * | 10/2009 | Bolton | 340/540 |
| 2009/0283597 | A1 * | 11/2009 | Charles et al. | 235/386 |

* cited by examiner

*Primary Examiner* — Daniel Walsh

(74) *Attorney, Agent, or Firm* — Stites & Harbison PLLC; Stephen J. Weyer

(57) ABSTRACT

The invention relates to a ballot box assembly for securely storing a paper ballot generated by an interactive user terminal includes a housing, a ballot storage chamber, an aperture and a drive assembly. The housing is provided for holding the ballot generated by the interactive user terminal. The housing includes a coupling portion for removeably securing the housing to the interactive user terminal. The ballot storage chamber is disposed within the housing. The aperture is provided for receiving the ballot from the interactive user terminal when the housing is secured to the interactive user terminal. The aperture passes through the housing. The drive assembly is provided for conveying the ballot from the aperture to the inner ballot storage chamber. The drive assembly selectively blocks passage of the ballot between the aperture and the ballot storage chamber.

20 Claims, 8 Drawing Sheets

VOTING APPARATUS WITH SECURE BALLOT BOX ASSEMBLY

BACKGROUND OF THE INVENTION

1. Field of the Invention

The present invention generally relates to an apparatus and a system for and method of securely generating and storing a ballot as part of a voting apparatus. In particular, the invention relates to a ballot box assembly for an interactive voting apparatus, as well as the system and method of generating the ballot and conveying it to a secure ballot box.

2. Brief Description of the Related Art

Providing a reliable and secure method, apparatus and/or system for collecting and counting votes is paramount to a democratic system of government. One method requires a voter to cast their votes by entering their selections into a machine that generates a paper record or ballot, which is then collected and later counted. While the collection of paper ballots is fairly reliable and secure, it does have its problems.

In contemporary voting systems, problems are encountered relating to the accuracy of the ballot. In particular, the generated ballot may not precisely reflect the voter's selections. Also, the voter is not given an opportunity to review the paper ballot generated by the machine, prior to it being deposited in a ballot box. Thus, the voter must trust that the machine will properly record his or her vote.

Also, ballots are traditionally made of paper or some similar material. However, the transfer of such material from the voting machine into the ballot box encounters other problems. Generally, voting machines rely on gravity to "drop" the ballot into the ballot box. Alternatively, a paper handling system inside the voting machine pushes the ballot into the ballot box. Either way, such systems are unreliable since the ballot is prone to getting jammed as it is pushed or otherwise externally forced into the ballot box.

Further, the ballot box itself becomes a security risk if someone can tamper with the contents. In particular, the integrity of the ballot box contents becomes compromised when an unauthorized person is able to either remove ballots from or insert ballots into a ballot box after it is separated from the voting machine. Ballot boxes include simple mechanical covers or doors that close an aperture used for inserting ballots. Such covers or doors can often be opened by poll workers or other non-authorized personnel, thus compromising the integrity of the ballots therein.

There is therefore a need for an efficient, reliable and secure method, apparatus or system for collecting and counting votes, which overcomes the shortcomings found in the prior art as set forth above. Such a method, apparatus or system preferably allows a voter to review their generated ballot before it is deposited within the ballot box. Also, a more reliable method, apparatus or system of depositing ballots within the ballot box should be provided. Preferably, such a method, apparatus or system is capable of keeping the ballot box secure, even after it is separated from the voting machine.

SUMMARY OF THE INVENTION

In accordance with one embodiment of the present invention, a ballot box assembly for securely storing a paper ballot generated by an interactive user terminal includes a housing, a ballot storage chamber, an aperture and a drive assembly. The housing is provided for holding the ballot generated by the interactive user terminal. The housing includes a coupling portion for removeably securing the housing to the interactive user terminal. The ballot storage chamber is disposed within the housing. The aperture is provided for receiving the ballot from the interactive user terminal when the housing is secured to the interactive user terminal. The aperture passes through the housing. The drive assembly is provided for conveying the ballot from the aperture to the inner ballot storage chamber. The drive assembly selectively blocks passage of the ballot between the aperture and the ballot storage chamber.

Additionally, the drive assembly can be disposed within the housing. The at least the coupling portion can be disposed within the interactive user terminal when the outer housing is secured to the interactive user terminal. The drive assembly can be activated by the interactive user terminal. The coupling portion can include a contact element for communicating at least one of power and signaling information from the interactive user terminal to the drive assembly. The drive assembly can include at least one roller for engaging the ballot. The drive assembly further includes a guide surface disposed below the aperture for directing the ballot toward the at least one roller.

Another embodiment of the present invention includes a system for generating and securely storing a ballot. The system includes an interactive user terminal for receiving a voter selection, a means for generating a paper ballot and a ballot box for receiving the generated paper ballot. The means for generating a paper ballot generates a paper ballot containing information corresponding to the voter selection. The generating means is disposed within the interactive user terminal. The ballot box is removeably coupled to the interactive user terminal for securely storing the generated ballot. The ballot box includes a drive assembly for conveying the ballot into a chamber within the ballot box.

Additionally, the interactive user terminal can include a ballot display window for displaying the generated ballot to a user prior to conveying the ballot to the chamber within the ballot box. The drive assembly can be contained within at least one of the interactive user terminal and the ballot box. The drive assembly can include at least one roller for engaging the generated ballot. The drive assembly can further include a guide surface disposed below a ballot box aperture for directing the ballot toward the at least one roller. The drive assembly can be activated by the interactive user terminal. Also, the means for generating a ballot can be a printer assembly contained within the interactive user terminal.

Yet another embodiment of the present invention relates to a method of generating and securely conveying a ballot from an interactive user terminal to a ballot box. The method includes receiving user input from the interactive user terminal, generating a paper ballot and conveying the ballot into the ballot box. The paper ballot being generated inside the interactive user terminal and containing information corresponding to the received user input. The ballot being conveyed through an aperture in the ballot box using a drive assembly contained in the ballot box while the ballot box is removeably coupled to the interactive user terminal. At least a portion of the ballot box being disposed inside the interactive user terminal. Also, the paper ballot is deposited inside the ballot box from inside the interactive user terminal.

Further, the method can further comprise displaying the generated ballot from inside the interactive user terminal to a user. Also, the drive assembly can be activated in response to the user input from the interactive user terminal. The drive assembly can include at least one driven roller for engaging the generated ballot. Also, the drive assembly can further include a guide surface disposed below a ballot box aperture for directing the ballot toward the at least one roller. The ballot box can be uncoupled from the interactive user terminal, thereby making the drive assembly inoperable.

Other embodiments and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1A:
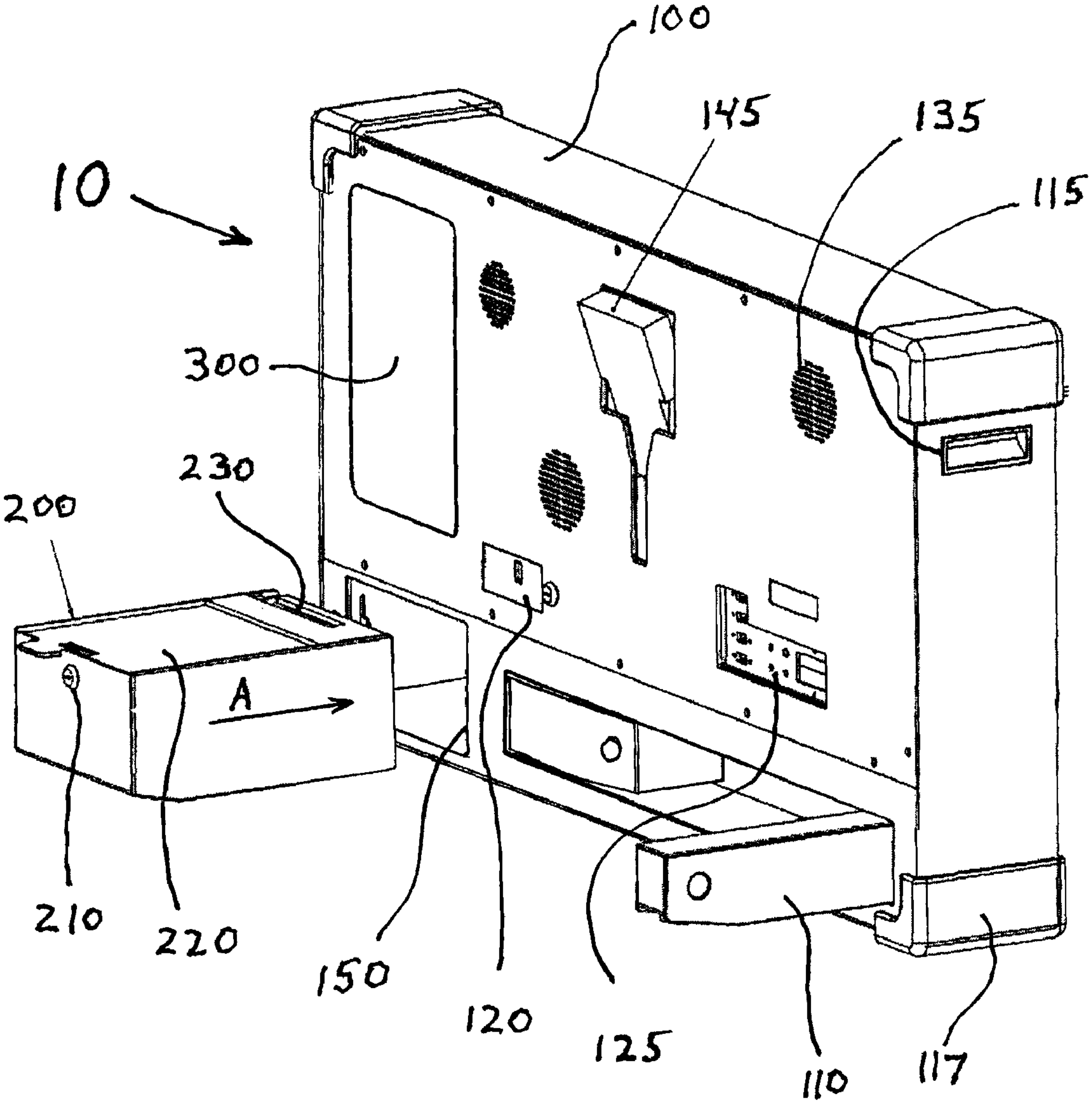
FIG. 1*a* is a partially exploded rear perspective view of a voting apparatus with a secure ballot box assembly pulled away from the assembly, in accordance with an embodiment of the present invention.
Figure 1B:
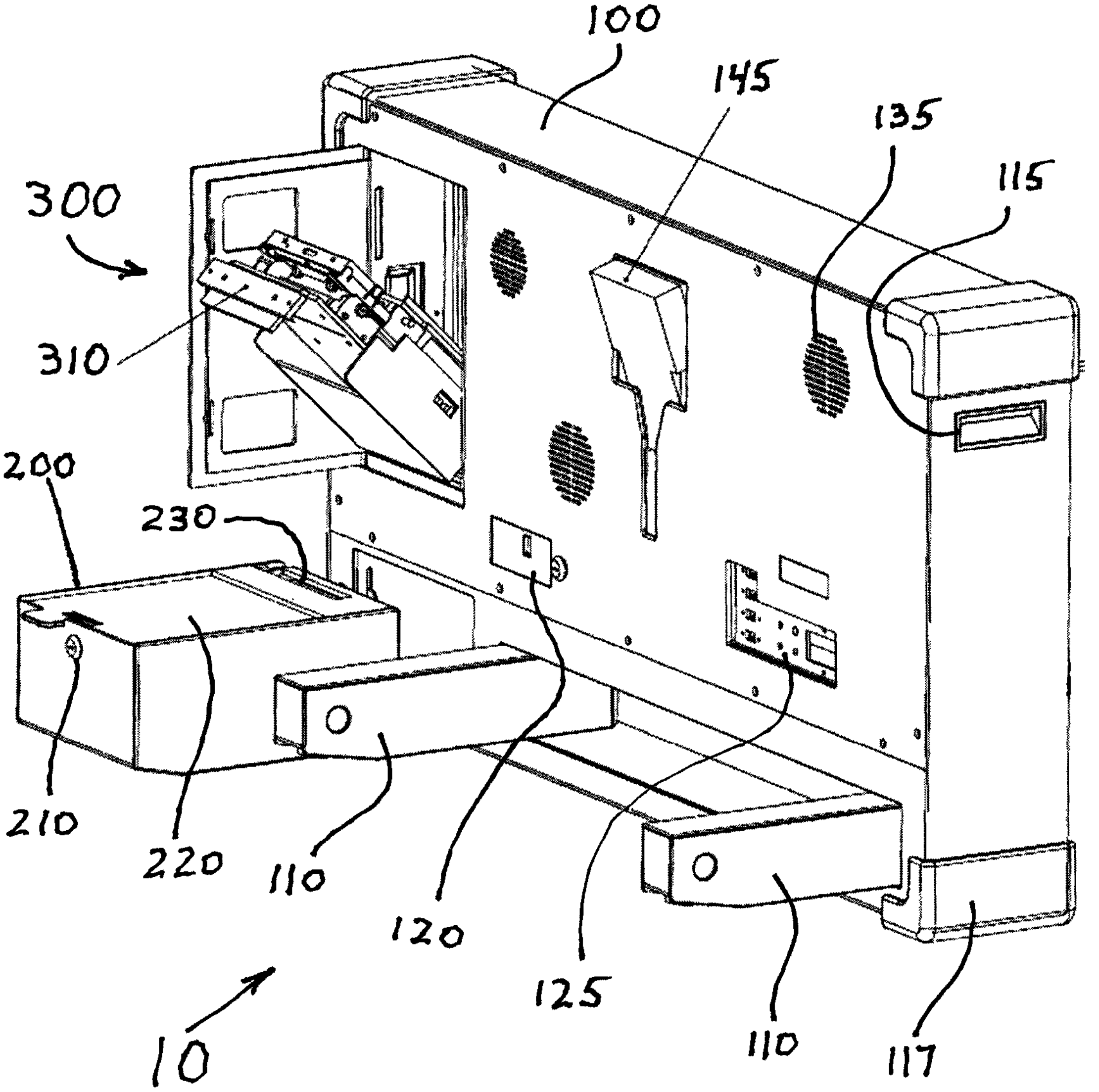
FIG. 1*b* is a rear perspective view of the voting apparatus of FIG. 1, showing the printer assembly in an open position, in accordance with an embodiment of the present invention.
Figure 2:
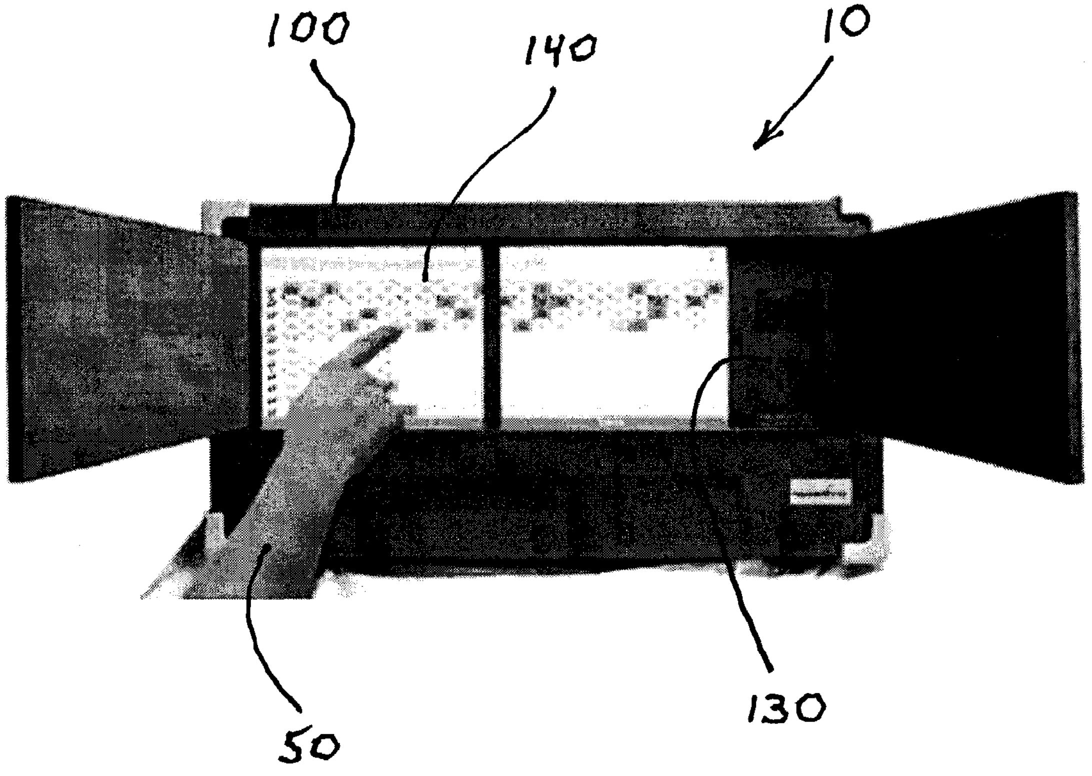
FIG. 2 is a front view of a voting system including a user interface, in accordance with an embodiment of the present invention.

With reference to the drawings, FIGS. 1*a*, 1*b* and 2 show a voting system 10 in accordance with an exemplary embodiment of the present invention. The voting system 10 includes a main housing unit 100 and a removeably coupled ballot box 200. Additionally, in the embodiment shown, the main housing unit 100 also includes an internal printer assembly 300 for securely generating ballots. Once a ballot is generated and approved by the user, it can be securely conveyed to and deposited within the coupled ballot box 200. In FIGS. 1*a* and 1*b*, the secure ballot box 200 is shown pulled away or uncoupled from the main housing unit 100. The main housing unit 100 is preferably provided with a coupling arrangement for having the ballot box 200 removeably secured thereto. The coupling arrangement preferably provides a configuration that enables a secure transfer of a ballot from inside the main housing unit 100 to the ballot box 200. Also, the ballot box 200 preferably includes a secure design that prevents tampering or fraud.

The main housing unit 100 shown in the drawings is an exemplary portable interactive user terminal. Supplemental features, such as handles 115 and edge guards 117 can be provided to assist in moving and protecting the unit 100. Also, fold-out arms 110 may be provided for maintaining the unit in a substantially vertical position as shown. The left arm 110 is shown in FIG. 1*a* in a stored position, but both arms 110 can preferably be rotated to extend away from the back of the unit 100, as shown in FIG. 1*b*. As the main housing 100 preferably includes an interactive user terminal, the arms 110 are configured to allow the unit 100 to lean slightly backward, providing a slight tilt to the user interface. Other features include removeably secured redundant memory ports 120, speakers 135 and additional input/output ports 125 as commonly found in contemporary desktop computer systems.

FIG. 2 is a front view of the voting system 10, showing a user 50 interacting with a user interface 140 that displays information while also providing a primary means for the user 50 to input information and/or make selections. Preferably, the user interface 140 is a touch-screen apparatus, such as those used in contemporary automated teller machines (ATM's) and other interactive electronic kiosks. It should be understood that in place of or in addition to the touch-screen user interface 140, a contemporary user monitor and keyboard (not shown) can be provided in the front of the housing unit 100 for user 50 input. Such a keyboard can be similar to the keyboards used with traditional computer terminals or more compact versions used in hand-held mobile communication devices. FIGS. 1*a* and 1*b* show a supplemental hand-held keypad 145 that can be stored in a pocket or recess on the main housing unit 100. The hand-held keypad 145 can be provided as an alternative input means for authorized personnel to enter security codes or information, or for people with special needs to make their voting selections. In the illustrated embodiment, the hand-held keypad 145 is stored in the rear of the machine, but such a pocket could be located almost anywhere on the unit 100. Alternatively, the device or the pocket could be externally mounted. Preferably, such a hand-held device 145 is easily removed from the rear pocket for a user 50 to handle and operate.

Figure 3:
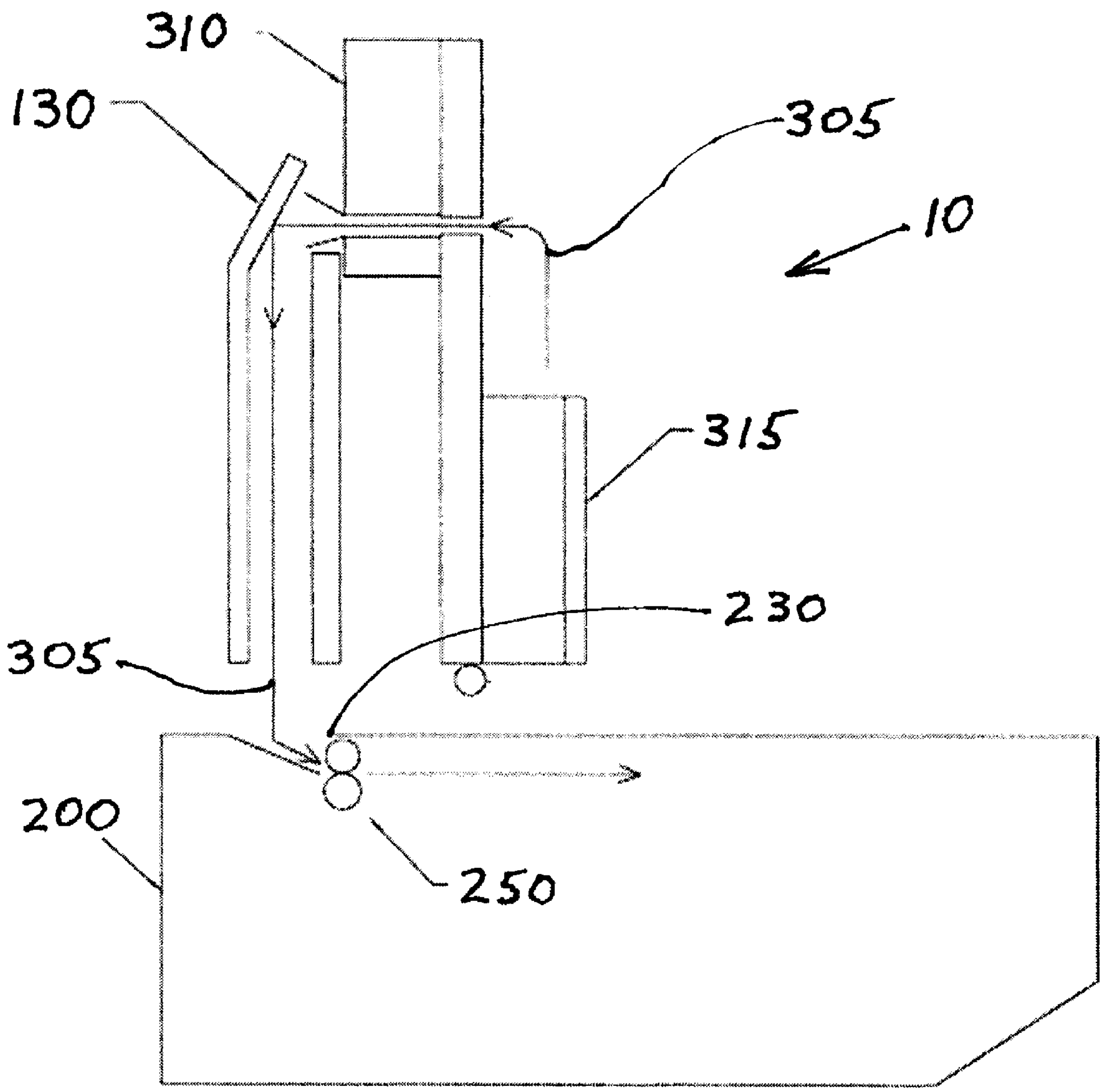
FIG. 3 is a schematic representation of a ballot handling path within the voting apparatus in accordance with an embodiment of the present invention.

FIG. 3 shows a schematic representation of a ballot handling path 305 as a ballot (not shown) passes through the voting apparatus 10. The ballot handling path 305 in a preferred embodiment originates in a stock ballot tray 315. As part of the system and method described herein, a ballot is moved from the stock ballot tray 315 along the path 305 to a printing station adjacent the printer 310. The stock ballot tray 315 preferably holds blank ballots. The printer 310 will then fill-in the ballot with the user's selection (i.e., the voter's elections). Although the blank ballots preferably include some pre-printed material on them, they could alternatively start completely blank. Also, while the ballots are preferably a card stock, other paper or materials could be used, including a roll of paper combined with a cutter for creating individual ballots. Once a user 50 has indicated that he/she is finished with his/her selections, the ballot gets moved, at least temporarily, to a ballot review station adjacent the ballot display window 130 for the user to view. The ballot display window 130 is also illustrated in FIG. 2. The ballot display window 130 is intended to give the user a chance to view the printed ballot and confirm it accurately represents the selections the user made through the interactive terminal 140. If the ballot is inaccurate, preferably the user can direct the ballot back to the printing station to void and/or correct the inaccurate ballot before it is sent to and deposited in the ballot box 200. Otherwise, if the printed ballot is approved by the user 50, it then gets moved to the ballot box 200 through the ballot box aperture 230, past the mechanical roller assembly 250 into the internal ballot box chamber 290.

FIGS. 4*a*-4*e* show further details of the ballot box assembly 200. An access lid 220 provides secure access to the internal ballot box chamber 290. The access lid 220 is supported by a protruding internal shoulder 222 and secured a rear end by being slid under a portion 241 of the rear top cover 240 for the ballot box. The access lid 220 is also secured at a front end of the ballot box by engaging elements 215 of the locking mechanism 210. A handling tab 225 is provided to make the lid 220 easier to open once the locking mechanism 210 is released. Also, the handling tab 225 can be used for holding the lid 220 as it is slid back under the portion 241 of the rear top cover 240. The ballot box aperture 230 is disposed in a portion of the rear top cover 240. Also, the aperture 230 is located above the internal mechanical roller assembly 250. The rear top cover 240 also has a power contact aperture 245.

Figure 4A:
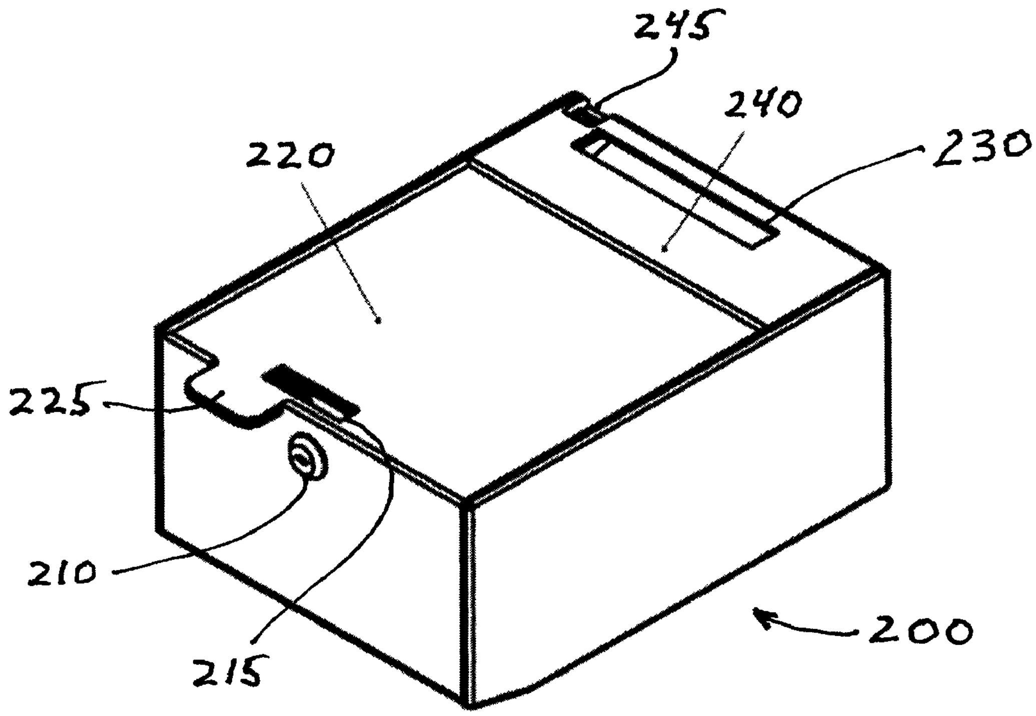
FIGS. 4*a-e* are respectively a perspective, right side, top, front, left side views of a ballot box assembly in accordance with an embodiment of the present invention.
Figure 4B:
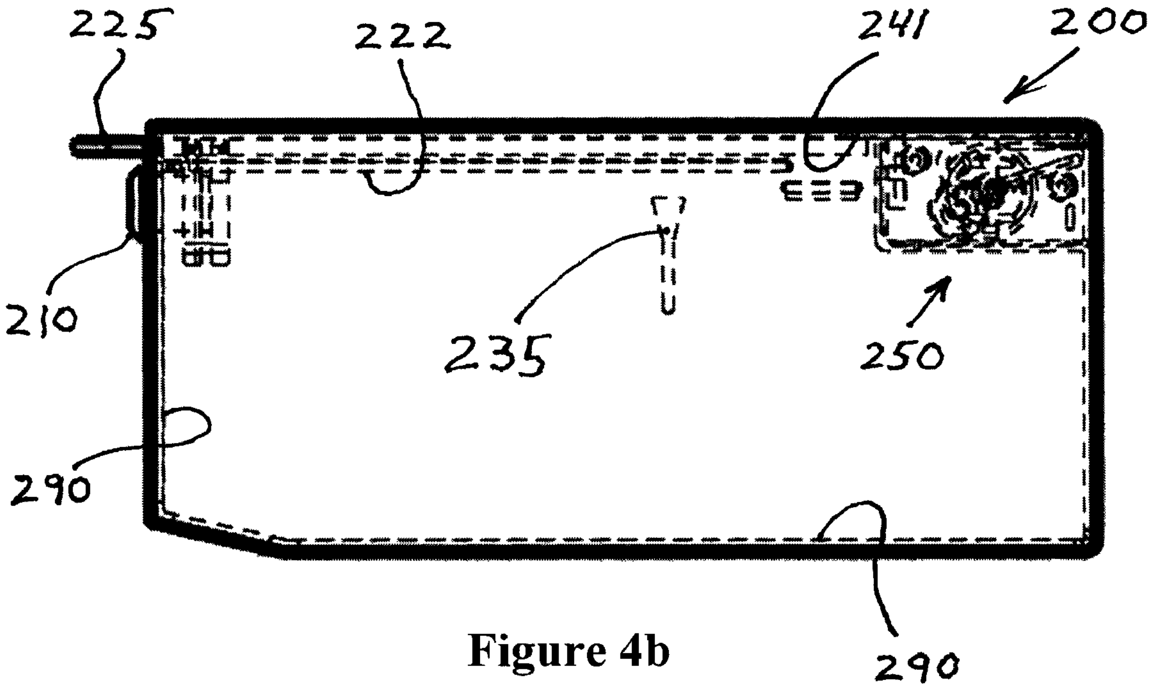
Figure 4C:
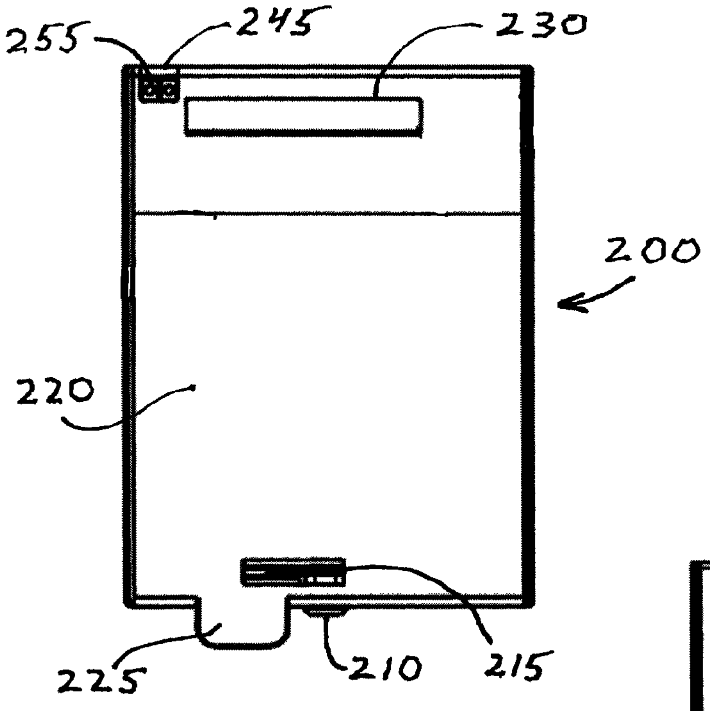
Figure 4D:
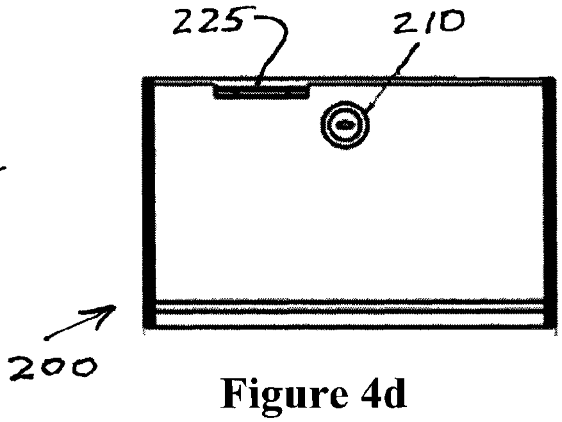
Figure 4E:
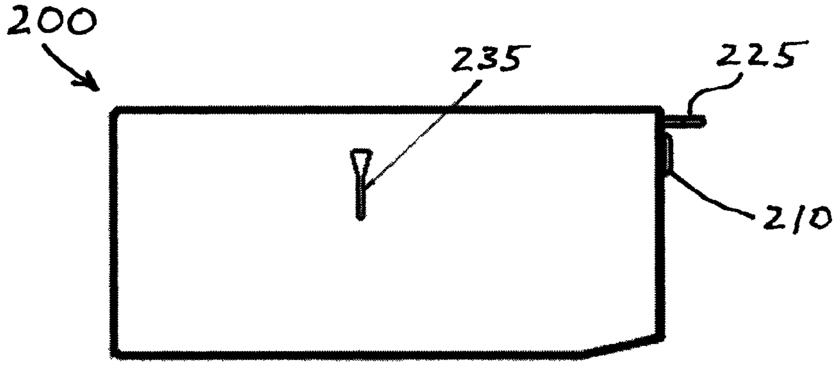
Figure 5A:
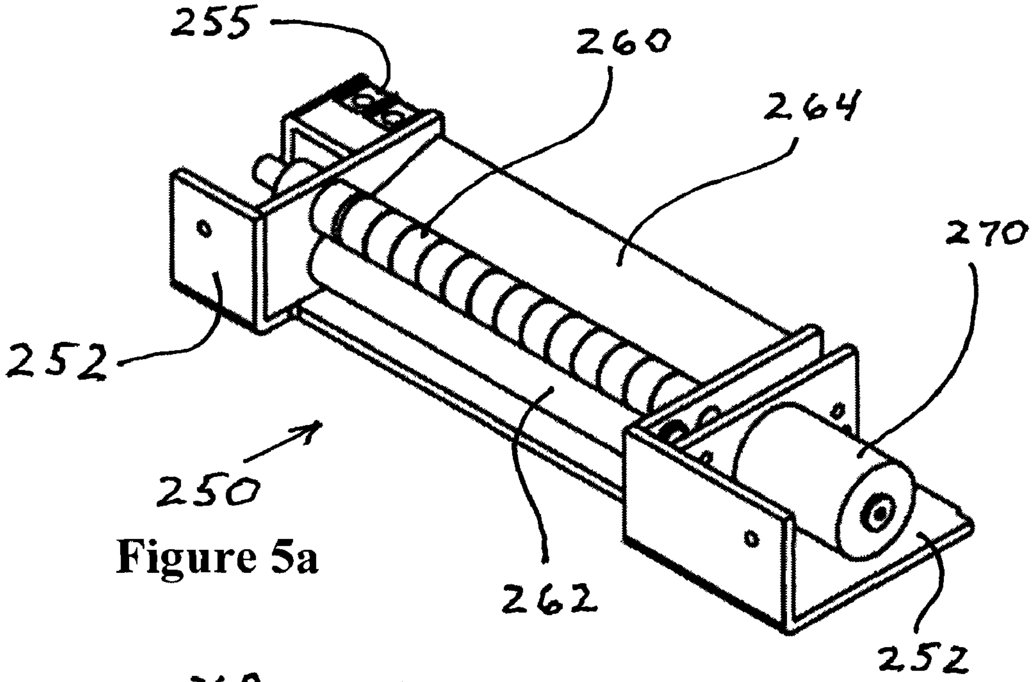
FIGS. 5*a-e* are respectively a perspective, right side, left side, top and front views of a ballot box assembly in accordance with an embodiment of the present invention.
Figure 5B:
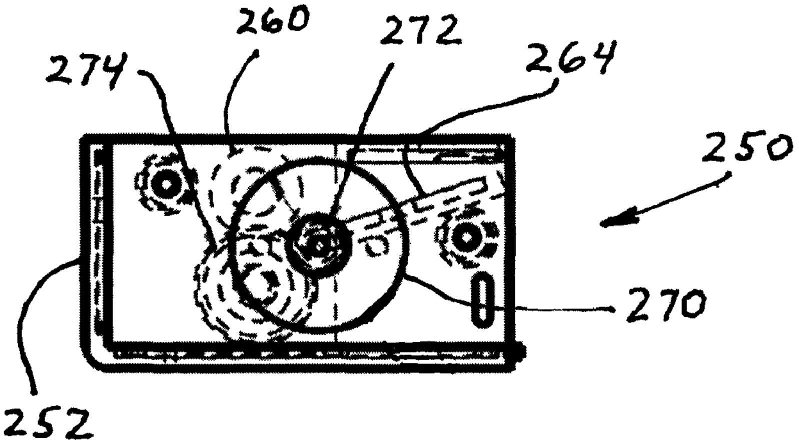
Figure 5C:
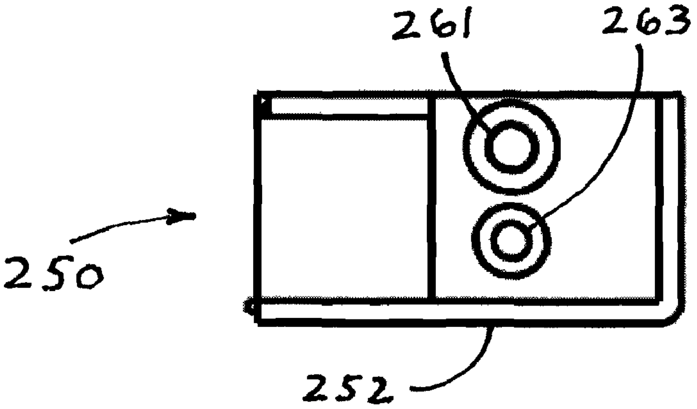
Figure 5D:
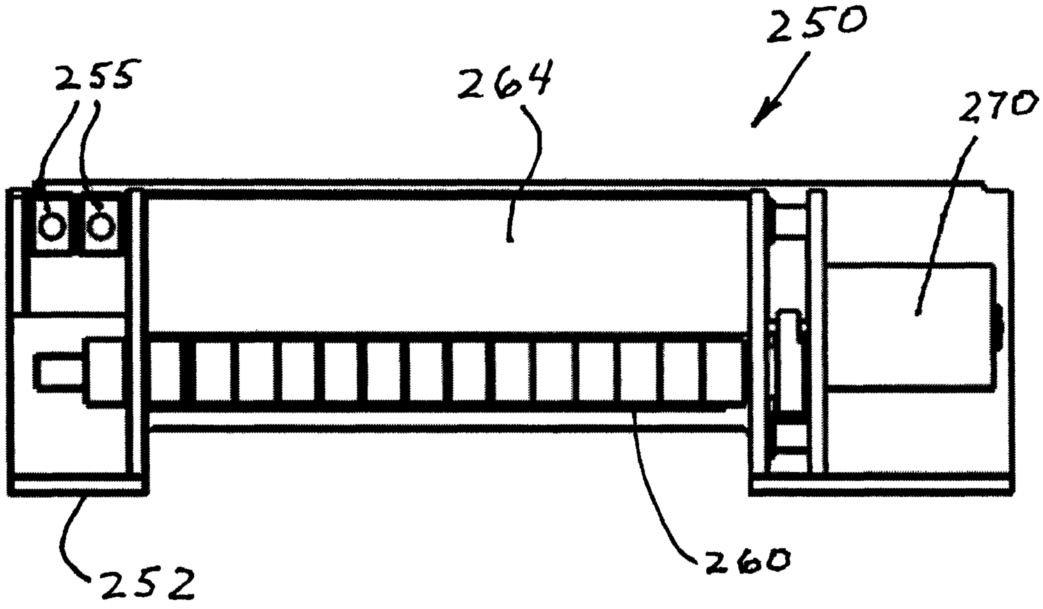
Figure 5E:
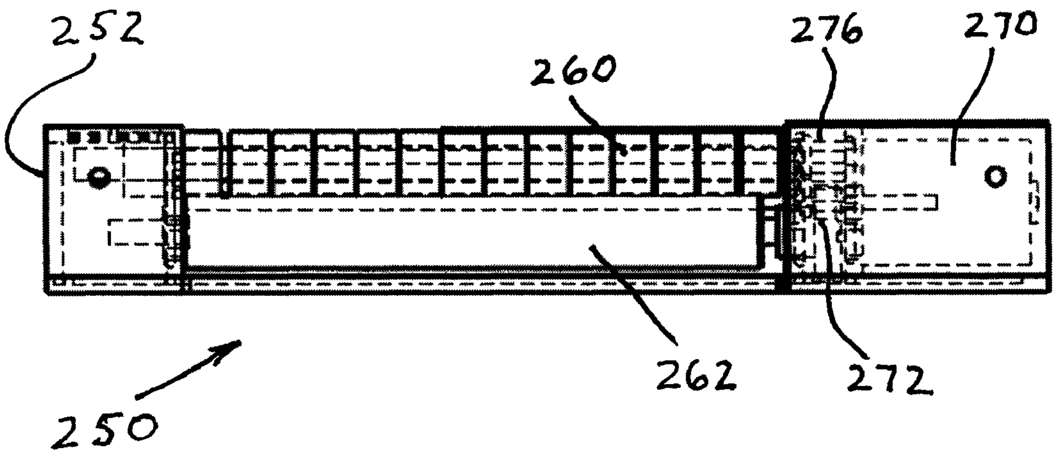

This smaller aperture 245 allows electrical contact to be made from contact elements (not shown) inside the main unit 100 to the drive assembly contacts 255, to power the mechanical roller assembly 250. Additionally, the ballot box assembly 200 can include a level indicator aperture 235 can be provided on one side of the ballot box 200, as shown in FIG. 4*e*. The level indicator aperture 235 allows poll workers or other individuals managing the system 10 to see or at least get a general idea of how many ballots are in the ballot box 200. In this way, as the height of the stack of ballots contained in the ballot box 200 rises past aperture 235, it can be seen from outside the ballot box 200.

FIGS. 5*a*-5*e* show further details of the drive assembly 250, which is disposed in the rear upper portion of the ballot box 200. Frame 252 supports the elements of the drive assembly 250 and attaches to the ballot box 200. One function of the drive assembly 250 is to draw-in a ballot, after it is conveyed or simply dropped from the ballot display window 130 toward the ballot box 200, as shown in FIG. 3. Also, once the ballot box 200 is uncoupled from the main housing unit 100, the drive assembly 250 preferably becomes inoperable, thus preventing anyone from inserting/removing one or more ballots.

The drive assembly 250 includes a rigid roller 260, a traction roller 262 and a slide plate 264, which cooperate to direct each ballot into the ballot box chamber 290. Each roller 260, 262 is supported by a drive shaft 261, 263, respectively and both drive shafts are supported at opposed ends by the drive assembly frame 252. Generally, just after passing through the ballot aperture 230, the ballot will engage the slide plate 264. The slide plate 264 directs to ballot toward the rollers 260, 262. The rollers 260, 262, which are driven by the motor 270, each rotate counter to one another. Thus, with reference to FIG. 5*b*, the upper roller 260 rotates clockwise, while the lower roller 262 rotates counterclockwise. Once a ballot engages either roller 260, 262 it is immediately directed toward the area between both rollers 260, 262. Preferably, this causes both rollers 260, 262 to engage and draw the ballot toward and into the chamber 290.

The drive assembly 250 is driven by motor 270. Preferably, motor 270 is a 12 volt DC motor that is supplied current through metal drive assembly contacts 255. However, it should be understood that an alternative motor assembly can be used. Also, the drive assembly contacts 255 can alternatively comprise a mating pin assembly. Thus, in addition to conveying power between the main housing unit 100 and the ballot box 200, the contacts 255 can be adapted to receive signaling information in order to prevent unauthorized activation of the drive assembly 250. Preferably, when a user 50 enters his or her approval of a ballot displayed in the ballot window 130, power and/or a signal is transmitted through contacts 255 to the motor 270, which in turn activates the motor 270. Thus, rotation of the motor gear 272 activates the roller gears 274, 276, which in-turn drive the rollers 260, 262. After a predetermined time interval, the main unit 100 can cut-off power to the drive assembly 250, when it is presumed the ballot will have fully passed through the rollers 260, 262. Alternatively, the drive assembly 250 can include one or more sensors that detect whether the ballot is present in or near the aperture 130, thus activating the motor 270.

In the embodiment shown in FIGS. 1*a* and 1*b*, a rear side of the ballot box 200 is inserted in direction A into a housing aperture 150. The housing aperture 150 is designed to matingly receive a portion of the ballot box 200 for coupling to the main housing unit 100. Thus, at least a portion of the ballot box 200 is disposed inside the main housing unit 100 when fully seated. Also, once the ballot box 200 is properly seated inside aperture 150, the contacts 255 should engage housing unit elements (not shown) for transferring power and/or signals to the drive assembly 250.

It should be understood that the main housing unit 100 can be formed with different proportions and/or an entirely different configuration of elements. Also, the user interface 140 or other supplemental features can be separate peripheral elements securely coupled to the main housing unit 100. Further, additional drive assembly can be provided to further guide the ballots along the ballot handling path 305.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A ballot box assembly for securely storing a paper ballot generated by an interactive user terminal, the ballot box assembly comprising:
- a housing for holding the ballot generated by the interactive user terminal, the housing including a coupling portion for removeably securing the housing to the interactive user terminal;
- a ballot storage chamber disposed within the housing;
- an aperture for receiving the ballot from the interactive user terminal when the housing is secured to the interactive user terminal, the aperture passing through the housing;
- a motorized drive assembly disposed in the housing and for conveying the ballot from the aperture to the ballot storage chamber, the motorized drive assembly selectively operable to feed a ballot from the interactive user terminal into the ballot storage chamber and to block passage of a ballot between the aperture and the ballot storage chamber when the drive assembly is not operable.

2. A ballot box assembly according to claim 1, wherein the drive assembly comprises an electric motor, the electric motor electrically conductively associated with a power contact, wherein said power contact is in contact with a complementary contact element of the interactive user terminal when the ballot box is coupled to the interactive user terminal.

3. A ballot box assembly according to claim 1, wherein at least the coupling portion is disposed within the interactive user terminal when the outer housing is secured to the interactive user terminal.

4. A ballot box assembly according to claim 1, wherein the motorized drive assembly is activated by the interactive user terminal.

5. A ballot box assembly according to claim 1, wherein the coupling portion includes a contact element for communicating at least one of power and signaling information from the interactive user terminal to the motorized drive assembly.

6. A ballot box assembly according to claim 1, wherein the motorized drive assembly includes at least one roller for engaging the ballot.

7. A ballot box assembly according to claim 6, wherein the motorized drive assembly further includes a guide surface disposed below the aperture for directing the ballot toward the at least one roller.

8. A system for generating and securely storing a ballot, the system comprising:
- an interactive user terminal for receiving a voter selection;
- a means for generating a paper ballot containing information corresponding to the voter selection, the generating means disposed within the interactive user terminal; and a ballot box for receiving the generated ballot, the ballot box comprising a housing for holding the generated paper ballot within a ballot storage chamber of the housing, the housing being removeably coupled to the interactive user terminal for securely storing the generated ballot, the ballot box including a motorized drive assembly disposed in the housing and for conveying the ballot into a chamber within the ballot box, the motorized drive assembly selectively operable to feed a ballot from the interactive user terminal into the ballot box.

9. A system according to claim 8, wherein the interactive user terminal includes a ballot display window for displaying the generated ballot to a user prior to conveying the ballot to the chamber within the ballot box.

10. A system according to claim 8, wherein the motorized drive assembly comprises an electric motor operable to selectively convey a ballot from the interactive user interface into the ballot box only when the ballot box is attached to the interactive user terminal and activated by the interactive user terminal.

11. A system according to claim 8, wherein the motorized drive assembly includes at least one roller for engaging the generated ballot.

12. A system according to claim 11, wherein the motorized drive assembly further includes a guide surface disposed below a ballot box aperture for directing the ballot toward the at least one roller.

13. A system according to claim 8, wherein the motorized drive assembly is activated by the interactive user terminal.

14. A system according to claim 8, wherein the means for generating a ballot is a printer assembly contained within the interactive user terminal.

15. A method of generating and securely conveying a ballot from an interactive user terminal to an attached ballot box, the method comprising:

receiving user input from the interactive user terminal;

generating a paper ballot inside the interactive user terminal corresponding to the received user input; and conveying the ballot via an aperture in the user terminal to the ballot box through an aperture in the ballot box using a motorized drive assembly contained in the ballot box while the ballot box is removeably coupled to the interactive user terminal, wherein at least a portion of the ballot box is disposed inside the interactive user terminal, such that the paper ballot is deposited inside the ballot box from inside the interactive user terminal.

16. The method according to claim 15, further comprising displaying the generated ballot from inside the interactive user terminal to a user.

17. The method according to claim 15, further comprising activating the motorized drive assembly in response to the user input from the interactive user terminal.

18. The method according to claim 15, wherein the motorized drive assembly includes at least one driven roller for engaging the generated ballot.

19. The method according to claim 18, wherein the motorized drive assembly further includes a guide surface disposed below a ballot box aperture for directing the ballot toward the at least one roller.

20. The method according to claim 15, further comprising, uncoupling the ballot box from the interactive user terminal, thereby making the drive assembly inoperable.

* * * * *